United States Patent
Park et al.

(10) Patent No.: US 8,032,809 B2
(45) Date of Patent: Oct. 4, 2011

(54) RETRANSMISSION AND DELAYED ACK TIMER MANAGEMENT LOGIC FOR TCP PROTOCOL

(75) Inventors: Chan-ho Park, Daejeon (KR); Kyoung Park, Daejeon (KR); Myung-joon Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 1094 days.

(21) Appl. No.: 11/721,213

(22) PCT Filed: Dec. 6, 2005

(86) PCT No.: PCT/KR2005/004143
§ 371 (c)(1),
(2), (4) Date: Jun. 8, 2007

(87) PCT Pub. No.: WO2006/062328
PCT Pub. Date: Jun. 15, 2006

(65) Prior Publication Data
US 2009/0241001 A1    Sep. 24, 2009

(30) Foreign Application Priority Data

Dec. 8, 2004  (KR) ............... 10-2004-0102912
Dec. 1, 2005  (KR) ............... 10-2005-0116490

(51) Int. Cl.
*H04L 1/18* (2006.01)
(52) U.S. Cl. .................... 714/749; 370/474
(58) Field of Classification Search ............... 714/749; 370/474
See application file for complete search history.

(56) References Cited

U.S. PATENT DOCUMENTS

| 4,618,955 | A  | * | 10/1986 | Sharpe et al. ........... 714/761 |
| 6,643,259 | B1 |   | 11/2003 | Borella et al. |
| 7,174,393 | B2 | * | 2/2007  | Boucher et al. ........ 709/250 |
| 7,403,542 | B1 | * | 7/2008  | Thompson ............. 370/474 |
| 7,515,612 | B1 | * | 4/2009  | Thompson ............. 370/474 |
| 2001/0027496 | A1 | * | 10/2001 | Boucher et al. ........ 709/250 |

(Continued)

FOREIGN PATENT DOCUMENTS

WO    WO0228032    4/2002

OTHER PUBLICATIONS

International Search Report; PCT/KR2005/004143; Mar. 15, 2006.

(Continued)

*Primary Examiner* — M. Mujtaba Chaudry
(74) *Attorney, Agent, or Firm* — Kile Park Goekjian Reed & McManus PLLC

(57) ABSTRACT

Provided is an apparatus for detection timeout of each channel, which is a socket connection, in a Transmission Control Protocol (TCP) Offload Engine (TOE) using TCP accelerating hardware, and a method thereof. The timer managing apparatus of the TOE using the TCP accelerating hardware, including: a command register for receiving a command for a retransmission timer or a delayed ACK timer from an embedded processor of the TOE; a finite state machine (FSM) for storing information of a timer in operation by analyzing the command for the retransmission timer or the delayed ACK timer stored in the command register and controlling an entire operation of the timer managing apparatus; and a timeout checker for checking timeout of a timer in operation by using the stored timer information and notifying the timeout to the FSM.

15 Claims, 6 Drawing Sheets

U.S. PATENT DOCUMENTS

| | | | |
|---|---|---|---|
| 2002/0156927 A1* | 10/2002 | Boucher et al. | 709/250 |
| 2004/0003106 A1 | 1/2004 | Cunningham et al. | |
| 2004/0054813 A1* | 3/2004 | Boucher et al. | 709/250 |
| 2004/0064589 A1* | 4/2004 | Boucher et al. | 709/250 |
| 2004/0073703 A1* | 4/2004 | Boucher et al. | 709/245 |
| 2004/0240413 A1 | 12/2004 | Kim et al. | |
| 2005/0060427 A1* | 3/2005 | Phillips et al. | 709/238 |
| 2005/0117582 A1* | 6/2005 | Biran et al. | 370/395.4 |
| 2005/0198350 A1 | 9/2005 | Tan et al. | |
| 2007/0136495 A1* | 6/2007 | Boucher et al. | 709/250 |
| 2008/0126553 A1* | 5/2008 | Boucher et al. | 709/230 |

OTHER PUBLICATIONS

Notification Concerning Transmittal of International Preliminary Report on patentability; PCT/KR2005/004143; Jun. 21, 2007.

* cited by examiner

FIG. 6

| | 63 | 62 | | 3 | 2 | 1 | 0 |
|---|---|---|---|---|---|---|---|
| | Delayed Ack timer tag [31] | Retransmission timer tag [31] | | Delayed Ack timer tag [1] | Retransmission timer tag [1] | Delayed Ack timer tag [0] | Retransmission timer tag [0] |
| | Delayed Ack timer tag [63] | Retransmission timer tag [63] | | Delayed Ack timer tag [33] | Retransmission timer tag [33] | Delayed Ack timer tag [32] | Retransmission timer tag [32] |
| | . | . | | . | | | |
| | . | . | | . | | | |
| | . | . | | . | | | |
| Delayed Ack timer tag [10239] | Retransmission timer tag [10239] | | | | | | |

RETRANSMISSION AND DELAYED ACK TIMER MANAGEMENT LOGIC FOR TCP PROTOCOL

TECHNICAL FIELD

The present invention relates to an apparatus for detection timeout of each channel, which is a socket connection, in a Transmission Control Protocol (TCP) Offload Engine (TOE) using TCP accelerating hardware, and a method thereof.

BACKGROUND ART

According to a Transmission Control Protocol (TCP), successful transmission of a segment is confirmed only after an ACK packet for the transmission is received when the ACK packet is not received for a predetermined time set up in a timer after the transmission of a segment, the segment is transmitted again. Herein, the timer is called a retransmission timer.

Also, when a receiving part receives a segment, an ACK packet for the reception should be transmitted. When the ACK packet is transmitted, a plurality of segments are received and all ACK informations for the segments are loaded in one packet and transmitted to raise efficiency instead of a method for transmitting on ACK packet for each segment. However, the receiving part receives a first segment, which does not transmit the ACK packet and sets up a timer to prevent excess of the retransmission timer in a transmitting part. Accordingly, when the timer exceeds, the receiving part unconditionally transmits the ACK packet.

A protocol stack of an operating system is generally in charge of conventional TCP processing and software manages the timers. The above-mentioned retransmission timer and the delayed ACK timer are required for every activated channel, and searching a timer table can be considerable overhead as the number of simultaneous connection increases.

DISCLOSURE

Technical Problem

It is, therefore, an object of the present invention to provide an apparatus for quickly and efficiently managing two timers for each channel when a Transmission Control Protocol (TCP) Offload Engine (TOE) is designed for TCP acceleration, and a method thereof.

It is another object of the present invention to provide a timer managing apparatus having an embedded processor in charge of setting of a timer and hardware in charge of detecting an excess time of the timer, to reduce a work quantity of the embedded processor for processing the protocol and quickly process the work in the TOE having the processor, and a method thereof.

It is another object of the present invention to provide a timer managing apparatus that can solve problems, which may be generated from a change in subjects for setting and resetting the timer in a structure for independently processing transmission and reception by adapting two embedded processors, quickly process packets and save resources, and a method thereof.

Technical Solution

In accordance with one aspect of the present invention, there is provided a timer managing apparatus of Transmission Control Protocol (TCP) Offload Engine (TOE) using TCP accelerating hardware, including: a command register for receiving a command for a retransmission timer or a delayed ACK timer from an embedded processor of the TOE; a finite state machine (FSM) for storing information of a timer in operation by analyzing the command for the retransmission timer or the delayed ACK timer stored in the command register and controlling an entire operation of the timer managing apparatus; and a timeout checker for checking timeout of a timer in operation by using the stored timer information and notifying the timeout to the FSM.

Also, the information of the timer in operation includes channel identification (ID) of a connected channel and timeout detection time.

In accordance with another aspect of the present invention, there is provided a TOE using TCP accelerating hardware, including: a transmission command register for receiving a command for a retransmission timer; a reception command register for receiving a command for a delayed ACK timer; a FSM for storing information of a timer in operation and timeout detection time by analyzing the command for the retransmission timer and the delayed ACK timer stored in the transmission and reception command registers, and controlling a timeout detection operation; a memory for storing information of the timer in operation, which is analyzed by the FSM; a time stamp memory for receiving and storing the timeout detection time from the FSM; a detector for searching whether there are timers in operation under a control of the FSM and notifying the result to the FSM; an ID increaser sequentially increasing address information corresponding to a channel ID of a TCP segment transmitting/receiving channel under the control of the FSM to make all channels searched; and a timeout checker for detection timeout by comparing timeout detection time stored in the time stamp memory with a real-time clock and notifying the generation of the timeout to the FSM.

In accordance with another aspect of the present invention, there is provided a TOE using TCP accelerating hardware, including the steps of: a) receiving a command for a retransmission timer or a delayed ACK timer from an embedded processor of the TOE; b) storing information on a timer in operation by analyzing the command for the retransmission timer or the delayed ACK timer; and c) checking whether timeout is generated in a timer in operation based on by using the stored timer information at a predetermined time interval.

In accordance with another aspect of the present invention, there is provided a TOE using TCP accelerating hardware, including the steps of: a) receiving a command for a retransmission timer or a delayed ACK timer of a channel transmitting/receiving a TCP segment in transmitting/receiving of the TCP segment; b) acquiring a memory access authority when the command is received; c) recording that the retransmission timer or the delayed ACK timer of the channel is in operation to a memory region conforming to a channel ID of the channel when the memory access authority is given, and determining whether the transmitted command is a reset command; and d) canceling the memory access authority when the transmitted command is a reset command, and initializing a predetermined command register for receiving a command.

In accordance with another aspect of the present invention, there is provided a TOE using TCP accelerating hardware, including the steps of: a) activating a timeout checking function every predetermined time interval; b) acquiring a memory access authority when the timeout checking function is activated; c) checking whether a timer in operation exists by reading a memory value when the memory access authority is given; and d) determining whether the timeout is generated by reading the timeout time of a channel with a timer in operation when the timer in operation exists, and storing the timeout in a predetermined queue when the timeout is generated.

Advantageous Effects

Transmission Control Protocol (TCP) accelerating hardware of the present invention, in which an embedded processor of TCP Offload Engine (TOE) can perform independent transmitting/receiving functions, can efficiently manage a retransmission timer and a delayed ACK timer.

A timer managing apparatus of the present invention reduces communications between processors generated by a difference between subjects which set/reset the timers, and reduces timeout search time increasing due to growing number of simultaneous access channels. Also, when the number of simultaneous access channels is small, the timer managing apparatus prevents time waste by useless search by separately equipping a memory 60 as well as a time stamp memory 011 for recording timeout time. The timer managing apparatus can also save memory resources by cutting and storing only a predetermined part of the timer, or by previously calculating and recording time to be timeout in a processor.

DESCRIPTION OF DRAWINGS

The above and other objects and features of the present invention will become apparent from the following description of the preferred embodiments given in conjunction with the accompanying drawings, in which:

FIG. 6 is an exemplary diagram showing a structure of a memory as shown in FIG. 2.

BEST MODE FOR THE INVENTION

The preferred embodiments of the present invention will be described in detail hereinafter with reference to the attached drawings. In addition, if it is considered that detailed description on prior art may blur the points of the present invention, the detailed description will not be provided herein.

<Principle of the Present Invention>

Generally, Transmission Control Protocol (TCP) Offload Engine (TOE) is realized by a method processing a protocol with an embedding processor, a method using a complete hardware logic, or a method combining the two methods.

Figure 1:
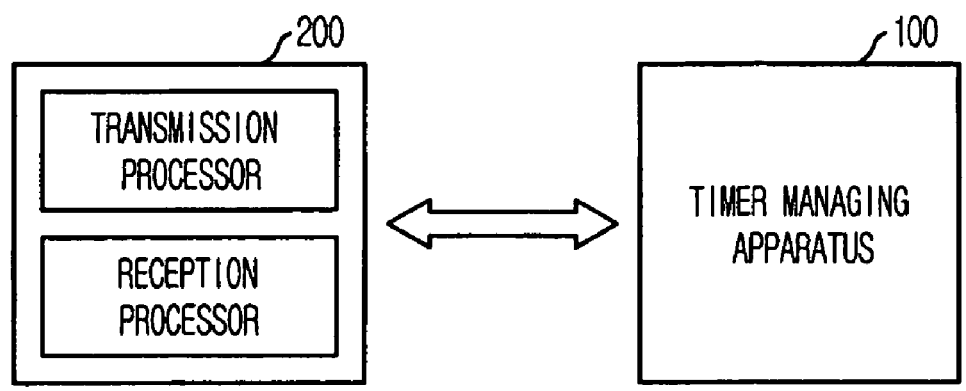
FIG. 1 is a block diagram describing a basic principle of the present invention.

As shown in FIG. 1, the present invention adopts the method combining the two methods. An embedded processor 200 of the TOE only sets up the timer whereas a timer managing apparatus 100 is in charge of detecting moment when the set-up time of the timer is up, i.e., to reduce the work quantity of the embedded processor and quickly process the work. As shown in FIG. 1, the embedded processor 200 of the TOE can be formed of a transmission processor and a reception processor.

<Embodiments Based on the Principle of the Present Invention>

Figure 2:
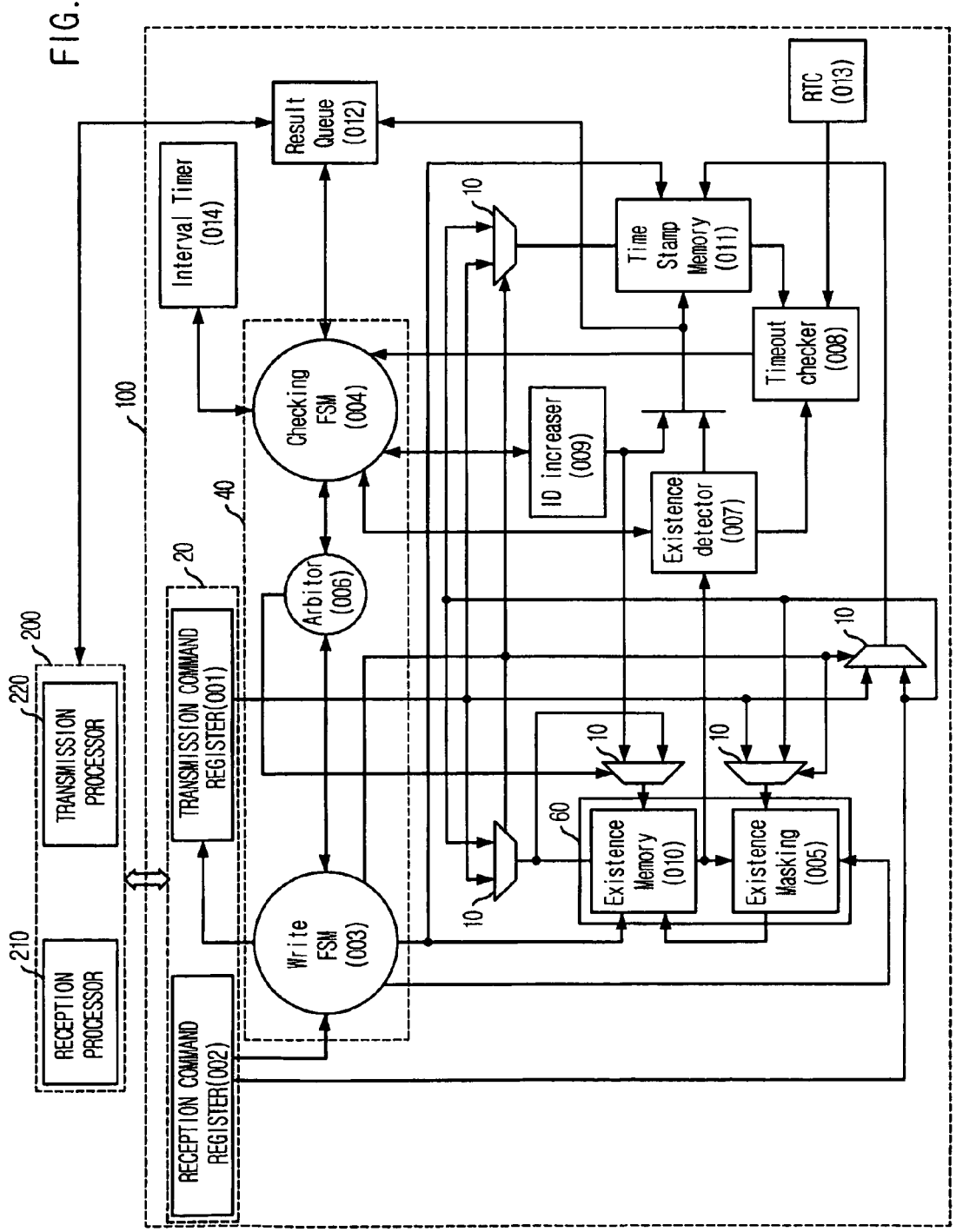
FIG. 2 is a schematic diagram showing a TCP retransmission and delayed ACK timer managing apparatus in accordance with an embodiment of the present invention.

FIG. 2 is a schematic diagram showing a TCP retransmission and delayed ACK timer managing apparatus in accordance with an embodiment of the present invention.

With reference to FIG. 2, the retransmission and delayed ACK timer managing apparatus 100 includes a command register 20, a finite state machine (FSM) 40, an existence memory 60, an existence detector 007, an identification (ID) increaser 009, an interval timer 014, a time stamp memory 011, a timeout checker 008, a Real Time Clock (RTC) 013 and a result queue 012. Herein, signal input/output between the constituent elements can be performed through a plurality of multiplexers 10.

The register 20 receives commands related to the retransmission timer or the delayed ACK timer from the processor 200. When the processor 200 transmits a TCP segment and receives ACK information for the TCP segment, and when the processor 200 receives the TCP segment and transmits ACK information for the TCP segment, the processor 200 transmits commands to the register 20.

The FSM 40 analyzes the command transmitted from the processor 200 to the register 20 and controls the operation of the retransmission timer and the delayed ACK timer based on the commands transmitted from the processor 200. As shown in FIG. 2, the register 20 includes a reception command register 002 and a transmission command register 001, and the FSM 40 includes a write FSM 003 for recording information in the memory 60 or the time stamp memory 011 by checking contents of the command transmitted to the command register and a checking FSM 004 for detecting the timeout.

The present invention will be described based on a structure that the embedded processor 200 of the TOE is formed of a reception processor 210 and a transmission processor 220 for the sake of convenience in explanation hereinafter.

As described above, in the timer managing apparatus 100 of the present invention, each of the transmission processor and the reception processor individually processes the TCP, or the transmission processor processes the TCP by extracting ACK information from transmitted packets and transmitting the ACK information to the transmission processor. When the structure of the command register is changed, the timer managing apparatus of the present invention can be applied to other modifications. Herein, the transmission command register 001 is connected to a transmission processor bus (not shown) and the reception command register 002 is connected to a reception processor bus (not shown).

Also, the result queue 012, which notifies a generation of the timeout, has a first-in first-out (FIFO) structure and it is connected to the processor through the transmission processor bus.

The entire operation for managing the timer of the TOE can be largely divided into three parts. The operation includes a first operation for transmitting a TCP segment and receiving related ACK information, a second operation for receiving a TCP segment transmitted by the other part and transmitting related ACK information and the third operation for checking whether timeout is generated in each channel at a predetermined interval.

When the transmission processor 220 commands the transmission command register 001, the first operation starts, and when the transmission processor 220 commands the transmission command register 001, or when the reception processor 210 commands the reception command register 002, the second operation starts. When the interval timer 014 notifies that the predetermined time exceeds, the third operation starts. When the timeout is found in the middle of the third operation, the related information is stored in the result queue 012 so that the transmission processor 220 can read the information.

Figure 3:
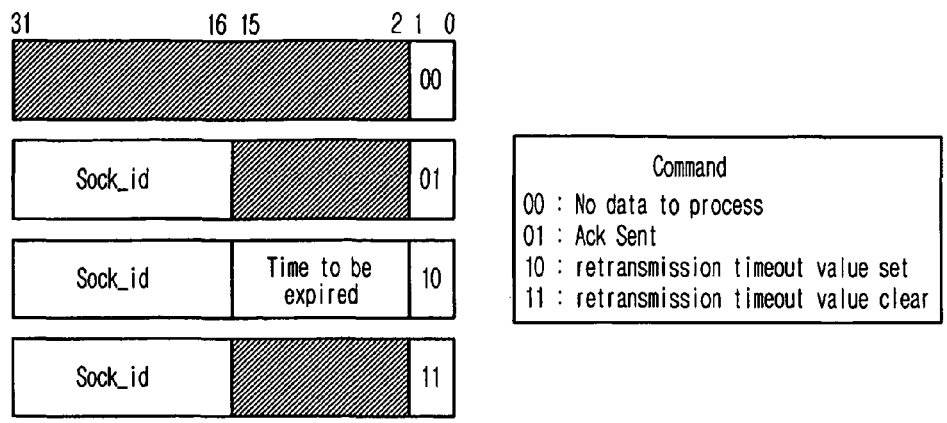
FIG. 3 is an exemplary diagram showing a data structure of a transmission command register as shown in FIG. 2.
Figure 4:
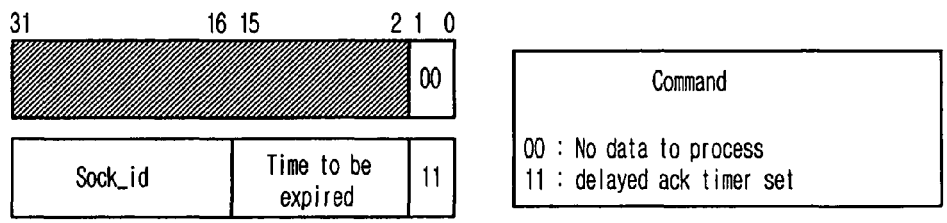
FIG. 4 is an exemplary diagram showing a data structure of a reception command register as shown in FIG. 2.
Figure 5:
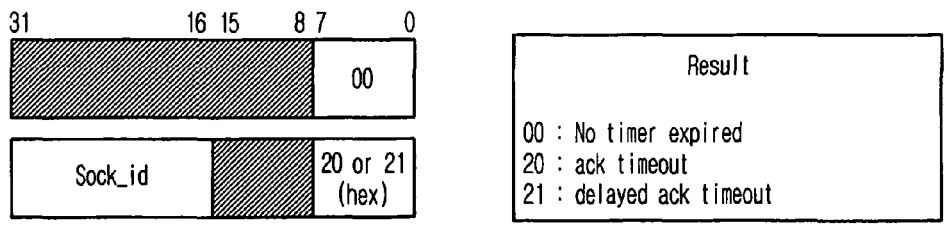
FIG. 5 is an exemplary diagram showing a data structure of a result queue as shown in FIG. 2.

FIGS. 3, 4 and 5 are diagrams showing data format of the transmission command register 001, the reception command register 002 and the result queue 012.

<Retransmission Timer>

When the embedded processor of the TOE transmits a TCP segment and receives ACK information, the retransmission timer is set up and an operation is executed as follows. When the embedded processor first transmits the TCP segment or transmits a new TCP segment after receiving the ACK information related to previously transmitted all segments, the transmission processor 220 commands a command field of the transmission command register 001 of FIG. 3 to set up the retransmission timer by using a command '10'.

The transmission processor 220 writes an ID of a channel transmitting a packet to a Sock_id field of the transmission command register 001, calculates and writes time when the timeout is detected, instead of the present time when the packet is transmitted in a 'Time to be expired' field. Subsequently, the write FSM 003 analyzes the transmission command register, records that the retransmission timer of the channel is operated in the memory 60 and records time when the timeout should be detected, in the time stamp memory 011.

When the embedded processor of the TOE receives ACK information for the transmitted packet and all packets transmitted by the embedded processor are confirmed, the transmission processor 220 commands the command field of the transmission command register 001 to reset the retransmission timer by using a command '11'. The write FSM 003 analyzes the command transmitted to the transmission command register and records in the memory 60 that the retransmission timer of the channel is not operated any more.

When the transmission processor 220 receives the ACK information but it has not finished checking all the transmitted yet, the transmission processor 220 makes a command of the command field '10' to maintain the command retransmission timer. Herein, the transmission processor 220 records the time when the timeout should be detected, in the 'Time to be expired' field with reference to the packet which does not receive the ACK information for the longest time.

<Delayed ACK Timer>

When the processor 200 receives the TCP segment and transmits related ACK information, the delayed ACK timer is operated. The delayed ACK timer is operated as follows. When the reception processor 210 receives the TCP segment, the reception processor 210 generates an ACK packet and keeps the ACK packet wait until the transmission processor 220 can transmit the ACK packet. Herein, when there is the ACK packet which is not transmitted yet and remaining in a waiting state, only the contents of the ACK packet to be transmitted are updated, and a command for the delayed ACK timer is not transmitted to the timer managing apparatus 100. However, when there is no waiting ACK packet, the reception processor 210 generates an ACK packet, keeps the ACK packet wait and fills a command field of the reception command register 002 with a command '11' to set up the delayed ACK timer. Just as the transmitting part, the time when the timeout of the delayed ACK timer should be detected, is recorded in the 'Time to be expired' field of the reception command register 002. Subsequently, the write FSM 003 analyzes the command transmitted to the reception command register 002, records that the delayed ACK timer is operated in the memory 60 and records the time when the timeout should be detected in the time stamp memory 011.

When the transmission processor 220 transmits the waiting ACK packet, the reception processor 210 fills the command field of the reception command register 002 with a command '01' to reset the delayed ACK timer. The write FSM 003 also analyzes the command and records that the delayed ACK timer is not operated in the memory 60.

<Time Out Detection>

The timeout detection starts when the interval timer 014 executes a checking function of the FSM 40 at a predetermined time interval. Since the entire timeout detection operation through hardware does not take a long time, power consumption is reduced by executing the operation at a predetermined time interval by using the interval timer 014, instead of continuously checking the operation. The timeout detection in the interval timer 014 is executed as follows.

When the previously set up time comes, the interval timer 014 operates a checking FSM 004, which is in charge of checking.

The checking FSM 004 resets the ID increaser 009 at 0, reads the first data of the memory 60 and stores them in the existence detector 007. A value stored in the ID increaser 009 shows an address except the lower 5 bits of the channel ID. As the value increases gradually, all channels can be searched. The memory 60 has a structure where it can read data on a 64-bit unit basis and it has a similar to the structure to that of FIG. 6. Therefore, the memory 60 can bring information from 32 channels simultaneously. The existence detector 007 finds a channel having a lowest channel ID among channels with a timer in operation based on the stored information, and generates the lowest 5-bit address of the found channel ID. When there is no channel having the operating timer, the existence detector 007 reports the fact to the checking FSM 004, and when there is a channel having the operating timer, the existence detector 007 reports to the timeout checker 008 which one of the delayed ACK timer and the retransmission timer is in operation.

When there is no timer in operation, the checking FSM 004 reads contents of the memory 60 in 32 channels by increasing the value of the ID increaser 009, and when there is a timer in operation, the checking FSM 004 reads a value of the time stamp memory 011 by using the value of the ID increaser 009 and a lower 5 bit address generated from the existence detector 007, and notifies the value to the timeout checker 008.

Figure 7:
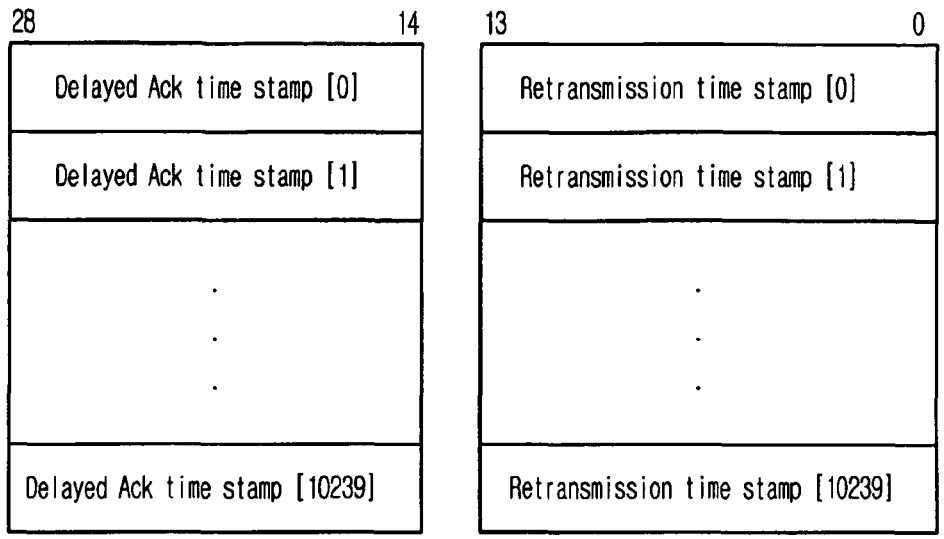
FIG. 7 is an exemplary diagram showing a memory structure of a time stamp memory as shown in FIG. 2.

The time stamp memory 011 has a structure of FIG. 7 and has a width of 28 bits. The time stamp memory 011 stores a retransmission time stamp and a delayed time stamp in different banks. It reads all values simultaneous and individually write the values.

Each timer has a 14-bit value. Therefore, when a half of the timer is an invalid region, the maximum interval becomes 8,196 folds of the minimum timeout detection interval. A packet of the generally connected channel has a different timeout determining interval based on the round trip time. Therefore, when timeout of the shortest time interval is 1 sec, timeout time of the longest time interval can be set up to 130 minutes. A time stamp used in a protocol has 32 bits every 1 ms unit, and it is determined 14 bits of which position among 32 bits are recorded in the command register based on how many seconds are determined as the timeout of the shortest time interval. Also, a memory space can be saved by increasing the number of bits when the maximum and minimum intervals should be larger, and decreasing the number of bits when the maximum and minimum intervals can be smaller.

The timeout checker 008 compares the value stored in the time stamp memory 011 with the real-time clock provided from the RTC 013 and checks the presence of the timeout in the retransmission timer or the delayed ACK timer. The timeout checker 008 notifies a check result to the checking FSM 004.

When timeout is generated, the checking FSM 004 records the timeout according to the format of FIG. 5 in the result queue 012.

When the timeout is generated in both of the retransmission timer and the delayed ACK timer, the generation of the timeout is recorded twice.

The checking FSM 004 finds out a channel having the second lowest ID among channels with a timer in operation by controlling the existence detector 007 after the result queue 012 is recorded or when the timeout is not generated.

The above-mentioned timeout detecting operation is repeated until the ID increaser 009 reads every value of the memory 60 and when the timeout detection is completed, the interval timer 014 is reset.

In the embodiment described above, when a certain TOE network supports 10,000 channels and a value of the ID increaser 009 becomes about 320, one timeout detecting operation is completed since the memory 60 can read 64 bits at a time.

A timer managing operation by the FSM 40 includes an operation for executing a command transmitted from the processor 200 and an operation for detection timeout based on information recorded in an internal memory of the timer managing apparatus 100, and an operation controlled by the write FSM 003 will be first described.

Figure 8:
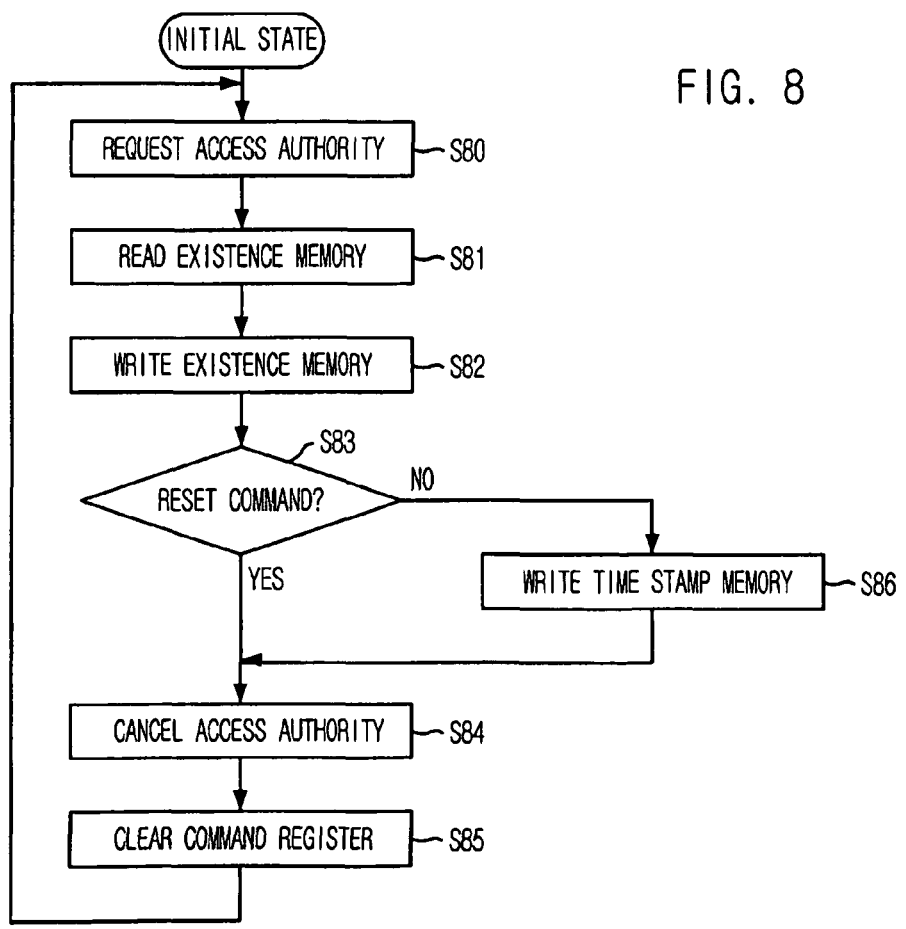
FIG. 8 is a flowchart describing a controlling process for executing a command transmitted from the embedded processor of FIG. 2.

FIG. 8 is a flowchart showing a controlling process for executing a command transmitted from the embedded processor of the TOE.

When a command enters the transmission command register 001 or the reception command register 002 initially, the write FSM 003 requests an access authority to an arbiter 006 at step S80. When a memory accesses, the arbiter 006 arbitrates between the write FSM 003 and the checking FSM 004 to prevent a collision since the checking FSM 004 might be operated to detect the timeout the moment when the command is received. At step S81, the write FSM 003 reads a part including a channel ID designated to the command register 20 from the memory 60. Reading should be first executed not to touch any data except the selected channel since information for reading/writing in the memory 60 includes as many as 32 channels simultaneously. Therefore, reading is first executed, and only a part corresponding to the designated channel among the 32 channels is operated and recorded in the memory at step S82. The memory 60 includes an existence masking 005 and the existence masking 005 operates and records only a part corresponding to the designated channel among the 32 channels in the memory.

The write FSM 003 determines at step S83 whether the transmitted command is a timer reset command. When the transmitted command is a reset command of the retransmission timer or the delayed ACK timer, the access authority is directly canceled at step S84. When the transmitted command is not the reset command of the timer, the time stamp value should be recorded. Therefore, when the transmitted command is not the reset command of the timer, the write FSM 003 stores data in the time stamp memory 011 at step S86 and cancels the access authority in the step S84. The processor 200 gets ready to issue the next command by clearing the register that has received the completely executed command that has been accomplished currently, i.e., the transmission command register 001 or the reception command register 002, and the write FSM 003 goes to the initial state.

Figure 9:
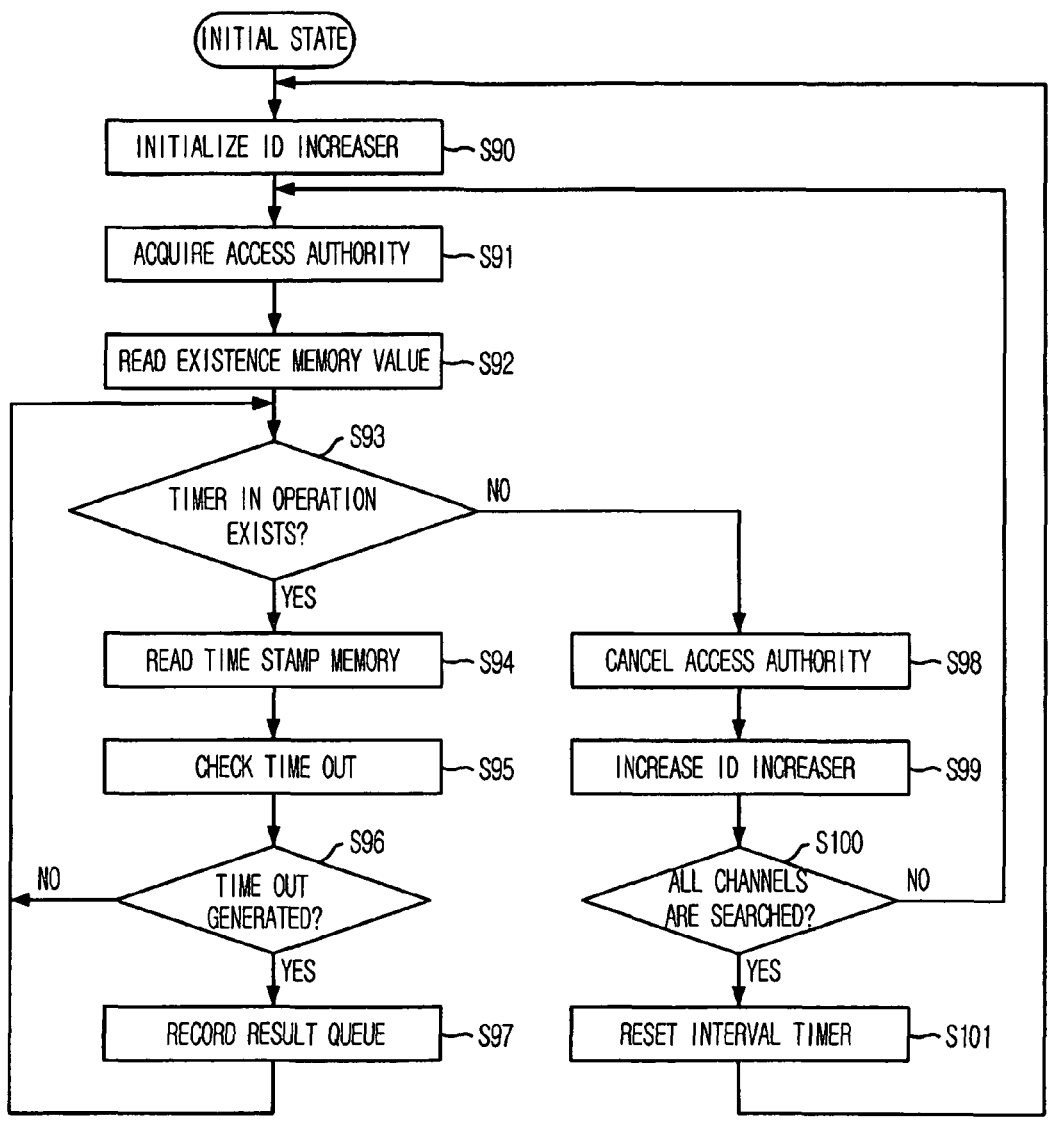
FIG. 9 is a flowchart describing a process for detection timeout based on information stored in a memory of the timer managing apparatus of FIG. 2.

FIG. 9 is a flowchart describing a process for detection timeout by using information stored in a memory of the timer managing apparatus.

When the interval timer 014 operates the checking FSM 004 at the predetermined interval time, the checking FSM 004 initializes the ID increaser 009 at step S90 and makes it possible to search channels from a number 0 channel. An access authority is acquired at step S91, and the memory 60 is read at step S92 and stored in the existence detector 007. At step S93, the existence detector 007 detects whether there is a channel with a timer in operation among the 32 channels and notifies the result to the checking FSM 004, thereby checking whether the timer is operated. When there is no timer in operation, the access authority is canceled at step S98 and an ID increaser 009 value is increased at step S99. Herein, the access authority should be canceled for a while in order not to delay the command entering the transmission command register 001 or the reception command register 002 until timeout check of all channels is finished.

It is determined at step S100 whether the increased ID increaser 009 value exceeds a counter value, at which all channels can be searched, and when the ID increaser 009 value does not exceed the counter value, the checking FSM 004 acquires the access authority at the step S91 and makes it possible to read 32 channel information.

In the determination result of the S100, when the increased ID increaser 009 value exceeds the counter value, in which all channels are searched, the checking FSM 004 resets the interval timer 014 to be able to move from 0 at step S101 and goes back to the initial state.

In the determination result of the S93, when there is a timer in operation, the checking FSM 004 reads the time stamp memory 011 and checks the timeout in the steps S94 to S96. In the determination result of the S96, when the timeout is not generated, the checking FSM 004 deletes present channel information among the 32 channel information read in the existence detector 007, goes back to the step S93 and checks whether there are other timers in operation. In the determination result of the S96, when the timeout is generated, the checking FSM 004 records the result in the result queue 012 at the step S97, goes back to the step S93 and checks whether there are timers in operation.

While the present invention has been described with respect to certain preferred embodiments, it will be apparent to those skilled in the art that various changes and modifications may be made without departing from the scope of the invention as defined in the following claims. Therefore, they should be construed that the scope of the present invention includes all of the above changes and modifications as well as the attached claims.

Industrial Applicability

Transmission Control Protocol (TCP) accelerating hardware of the present invention, in which an embedded processor of TCP Offload Engine (TOE) can perform independent transmitting/receiving functions, can efficiently manage a retransmission timer and a delayed ACK timer.

What is claimed is:

1. A timer managing apparatus of a Transmission Control Protocol (TCP) Offload Engine (TOE) using hardware for accelerating a TCP, comprising:

a command register configured to receive a command for timeout of a retransmission timer or a delayed ACK timer from an embedded processor of the TOE, and store the command of the retransmission timer or the delayed ACK timer;

a finite state machine (FSM) configured to analyze the stored command, store information of an operating timer based on the analyzed command, and control an entire operation of the timer managing apparatus; and a timeout checker configured to check timeout of a currently operating timer among the retransmission timer and the delayed ACK timer by using the stored information, and notify the checked timeout to the FSM.

2. The timer managing apparatus as recited in claim 1, wherein the information of the operating timer includes channel identification (ID) of a connected channel in all channels, and timeout checking time of the retransmission timer or the delayed ACK timer.

3. The timer managing apparatus as recited in claim 2, further comprising:

an interval timer configured to notify the timeout checking time to the FSM at a predetermined time interval.

4. The timer managing apparatus as recited in claim 1, further comprising:

an ID increaser configured to sequentially increase address information corresponding to a channel ID of a TCP segment transmitting/receiving channel to search all channels by controlling the FSM.

5. The timer managing apparatus as recited in claim 1, further comprising:

a Real Time Clock (RTC) configured to provide a real-time clock to the timeout checker.

6. The timer managing apparatus as recited in claim 1, wherein the command register includes:

a transmission command register configured to receive a command of the retransmission timer; and a reception command register configured to receive a command of the delayed ACK timer.

7. The timer managing apparatus as recited in claim 6, wherein the command of the retransmission timer and the command of the delayed ACK timer respectively include time information whose timeout should be checked.

8. The timer managing apparatus as recited in claim 1, wherein the FSM includes:

a write FSM configured to analyze the stored command, store the stored command in a memory, and store timeout checking time of the timeout in a time stamp memory; and a checking FSM configured to control a checking operation of the timeout of the currently operating timer.

9. The timer managing apparatus as recited in claim 8, wherein the FSM further includes an arbiter configured to prevent the write FSM and the checking FSM from simultaneously accessing a memory.

10. The timer managing apparatus as recited in claim 1, wherein when the timeout of the currently operating timer is notified to the FSM, the FSM stores the timeout in a predetermined queue to notice generation of the timeout in the embedded processor.

11. A timer managing method of a Transmission Control Protocol (TCP) Offload Engine (TOE) using hardware for accelerating a TCP, comprising the steps of:

a) receiving a command for timeout of a retransmission timer or a delayed ACK timer from an embedded processor of the TOE, and storing the command of the retransmission timer or the delayed ACK timer;

b) analyzing the stored command, storing information of an operating timer based on the analyzed command; and c) checking whether timeout is generated in a currently operating timer among the retransmission timer and the delayed ACK timer based on the stored information at a predetermined time interval.

12. The timer managing method as recited in claim 11, wherein the information of the operating timer includes channel identification (ID) of a connected channel in all channels, and timeout checking time of the retransmission timer or the delayed ACK timer.

13. The timer managing method as recited in claim 12, wherein the step b) includes the steps of:

b1) acquiring a memory access authority; and b2) recording currently operating retransmission timer of a channel corresponding to the channel ID in a memory, and recording the timeout checking time in a time stamp memory.

14. The timer managing method as recited in claim 13, wherein the step c) includes the steps of:

c1) acquiring the memory access authority;

c2) reading a memory value in the memory, and checking whether the currently operating timer exists based on the memory value;

c3) reading timeout checking time of the currently operating timer from the time stamp memory, and checking the timeout of the currently operating timer, when the currently operating timer exists; and c4) recording generation of the timeout in a predetermined queue when the timeout is generated.

15. The timer managing method as recited in claim 14, wherein the step C2) is repeated sequentially with respect to each of the channels.

* * * * *